US010720246B2

(12) United States Patent
McCarty et al.

(10) Patent No.: US 10,720,246 B2
(45) Date of Patent: Jul. 21, 2020

(54) FUEL ASSEMBLY ARRANGEMENT FOR RETAINING FUEL ROD END PLUG TO BOTTOM NOZZLE (71) Applicant: WESTINGHOUSE ELECTRIC COMPANY, LLC, Cranberry Township, PA (US)

(72) Inventors: Jeffrey M. McCarty, Cayce, SC (US); Nathan J. Payne, West Columbia, SC (US); Kirkland D. Broach, Lexington, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 339 days.

(21) Appl. No.: 15/492,017

(22) Filed: Apr. 20, 2017

(65) Prior Publication Data
US 2018/0308590 A1    Oct. 25, 2018

(51) Int. Cl.
G21C 3/33     (2006.01)
G21C 3/32     (2006.01)
G21C 3/10     (2006.01)

(52) U.S. Cl.
CPC ............ *G21C 3/3305* (2013.01); *G21C 3/10* (2013.01); *G21C 3/3206* (2013.01); *Y02E 30/40* (2013.01)

(58) Field of Classification Search
CPC ..... G21C 3/3305; G21C 3/3206; G21C 3/331
USPC ................................................. 376/364, 440
See application file for complete search history.

(56) References Cited

U.S. PATENT DOCUMENTS

| 3,945,885 | A |   | 3/1976 | Cocker et al. |
| 4,344,914 | A |   | 8/1982 | Rosa |
| 4,492,668 | A | * | 1/1985 | Pilgrim ................. G21C 3/326 376/440 |
| 4,560,532 | A | * | 12/1985 | Barry ................... G21C 3/3305 376/446 |
| 5,278,883 | A | * | 1/1994 | Patterson ............... G21C 3/348 376/439 |
| 5,646,973 | A | * | 7/1997 | Proebstle ................ G21C 3/33 376/446 |

(Continued)

FOREIGN PATENT DOCUMENTS

DE    2520345 A1    11/1976
EP    0563694 A2    10/1993
(Continued)

OTHER PUBLICATIONS

Westinghouse Electric Company LLC, PCT/US2015/015521, PCT International Search Report, dated Nov. 7, 2015, 10 pages.

*Primary Examiner* — Jack W Keith
*Assistant Examiner* — Daniel Wasil
(74) *Attorney, Agent, or Firm* — K&L Gates LLP (57) ABSTRACT

An improved retention system for retaining fuel rods in a fuel assembly is disclosed. The retention system includes a plurality of first engagement surfaces on the bottom nozzle of a fuel assembly. There is at least one engagement surface for each fuel rod. A second engagement surface is formed on the bottom end plug of each fuel rod. The first and second engagement surfaces are configured for engagement with each other for axially and laterally retaining each fuel rod within the fuel assembly. Debris deflectors may also be provided to deflect debris from coolant channels surrounding the fuel rods.

16 Claims, 10 Drawing Sheets

(56) References Cited

U.S. PATENT DOCUMENTS

| | | | |
|---|---|---|---|
| 5,878,100 A * | 3/1999 | Johannesson | G21C 3/322 376/440 |
| 6,310,931 B1 * | 10/2001 | Gustafsson | G21C 3/12 376/261 |
| 6,421,407 B1 | 7/2002 | Kang et al. | |
| 6,608,880 B2 | 8/2003 | Smith et al. | |
| 7,085,340 B2 | 8/2006 | Goldenfield et al. | |
| 7,822,165 B2 | 10/2010 | Broach et al. | |
| 8,369,475 B2 | 2/2013 | Lu et al. | |
| 2006/0045231 A1 | 3/2006 | Lee et al. | |
| 2007/0165767 A1 | 7/2007 | Labarriere et al. | |
| 2007/0183556 A1 * | 8/2007 | Labarriere | G21C 3/3305 376/440 |
| 2010/0246747 A1 | 9/2010 | Gomez et al. | |
| 2012/0093275 A1 * | 4/2012 | Defilippis | G21C 3/3305 376/440 |
| 2017/0352438 A1 * | 12/2017 | Broach | G21C 3/3305 |
| 2018/0254112 A1 * | 9/2018 | Payne | G21C 3/3305 |

FOREIGN PATENT DOCUMENTS

| | | |
|---|---|---|
| JP | 60152983 | 8/1985 |
| JP | 2011503534 | 1/2011 |
| KR | 20040040432 | 5/2004 |
| WO | WO2015175041 A2 | 11/2015 |

* cited by examiner

FUEL ASSEMBLY ARRANGEMENT FOR RETAINING FUEL ROD END PLUG TO BOTTOM NOZZLE

BACKGROUND OF THE INVENTION

1. Field of the Invention

The invention relates to fuel rods for nuclear reactors, and more particularly to a retention system for axial and lateral retention of a fuel rod in a reactor fuel assembly.

2. Description of the Prior Art

Conventional nuclear reactor assemblies include a bottom nozzle, a top nozzle, fuel rods extending axially between the top and bottom nozzles, and channels defined in the top and bottom nozzles for passage of coolant past the fuel rods. Current fuel assembly designs typically also include a protective grid and a bottom grid. The protective grid attaches above the bottom nozzle and grid straps that bisect the nozzle flow holes to mitigate the transfer of debris in the coolant liquid. The bottom grid is the main support for the fuel rods.

The numerous parts needed for securing the rods adds to the complexity of the fuel assembly design, which results in higher construction costs, but adds little or nothing to enhance energy production.

SUMMARY OF THE INVENTION

An improved design for retaining fuel rods in a fuel assembly is described herein. The improved retention system is for use in a nuclear fuel assembly that includes generally, such conventional components as a bottom nozzle, a top nozzle, a plurality of fuel rods extending axially between the top and bottom nozzles, and channels defined in the top and bottom nozzles for passage of coolant past the fuel rods. Each fuel rod in the conventional assembly has a bottom end plug. The fuel rods, as stated, currently are secured by a protective grid and a bottom grid. The improvement in the retention system for fuel rods within the assembly comprises a plurality of first engagement surfaces on the bottom nozzle. There is, in various aspects, one first engagement surface for each fuel rod. In various aspects, the improvement further comprises a second engagement surface on the bottom end plug of each fuel rod. The first and second engagement surfaces are configured for engagement with each other for axially retaining each fuel rod within the fuel assembly. This arrangement allows for the elimination of the bottom grid and protective grid. The fuel rods, through the end plugs of each fuel rod, may instead be attached directly to engagement surfaces on the bottom nozzle of the fuel assembly.

In various aspects, the bottom nozzle in the improved retention system described herein may have a plurality of recesses, each recess being configured for seating the bottom end plug of one of the plurality of fuel rods. In various aspects, each recess defines a central axis therethrough, and at least one retainer projecting from the recess for engagement with the second engagement surface of the end plug. The retainer may project from the recess co-axially with the central axis to engage the secondary engagement surface. Alternatively, the retainer or retainers may project from the periphery of the recess to engage the secondary engagement surface. In certain aspects, there are multiple retainers projecting from the periphery of the recess.

Also described herein is an end plug for a nuclear fuel rod that may comprise an engagement surface thereon for axially engaging an engagement surface of a nozzle of a fuel assembly. The end plug engagement surface in various aspects may comprise a cavity for receiving the engagement surface on the nozzle. In various aspects, the cavity comprises end portions for engaging the engagement surface of the nozzle. In various aspects, the engagement surfaces on the end plug and on the nozzle are complementary engagement surfaces having contours that fit or snap together to secure the fuel rod, connected to the end plug into axial alignment in the fuel assembly. In various aspects, the engagement surfaces on the end plug and on the nozzle retain the fuel rod laterally within the fuel assembly.

In an alternative embodiment, the end plug may comprise a retainer that projects from the end plug for engagement with the engagement surface on the bottom nozzle. In various aspects, the bottom nozzle may comprise a cavity for receiving the engagement surface on the end plug.

Also described herein in various aspects is a nozzle for use in a nuclear fuel assembly. The nozzle may comprise a plurality of recesses, each recess being configured for seating a bottom end plug of a fuel rod and each recess defining a central axis therethrough. In various aspects, the nozzle may further include at least one retainer projecting from the recess for axially engaging an engagement surface on the end plug of the fuel rod. The nozzle retainer may in various aspects comprise at least one boss member having a stem portion extending from the recess and a flanged portion extending radially outwardly from the stem portion.

The nozzle may include in addition, or alternatively, at least one retainer projecting from the periphery of one or more recesses for retention, in use, of the fuel rod seated in that recess. The end plug in such an embodiment, may comprise engagement surfaces on the exterior of the end plug for engaging the at least one peripherally positioned retainer. Preferably, each recess comprises at least one, preferably two, and more preferably three or more peripherally positioned retainers for retention, in use, of the fuel rod seated in that recess.

In various aspects, one of the first and second engagement surfaces are segmented to lend flexibility to the segmented surface. In various aspects, one of the first and second engagement surfaces is flexible for enabling movement thereof, in use, during engagement of the first and second engagement surfaces. In certain aspects, the cavity in the end plug may comprise at least one, and in various aspects, two or more longitudinal gaps therein for enabling flexible movement of the end portions of the cavity. In various aspects, the boss member projecting from the recess in the bottom nozzle may be rigid.

In an alternative embodiment, the retainer projecting from the recess in the bottom nozzle may be segmented for enabling movement of the retainer, in use, during engagement of the retainer with the engagement surface of the end plug. In certain aspects, the segmented retainer may comprise at least a pair of stem and flanged portions spaced from each other, and preferably equidistant from the central axis of the recess, for enabling flexible movement of the stem portions, in use, during engagement with the engagement surface of the end plug. In various aspects, the engagement surface of the end plug, such as embodiments having a cavity and end portions, may be rigid.

BRIEF DESCRIPTION OF THE DRAWINGS

The characteristics and advantages of the present disclosure may be better understood by reference to the accompanying figures.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, upward, downward, outward, front, back, and variations thereof, shall relate to the orientation of the elements relative to each other as shown in the accompanying drawing or described herein and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Figure 1:
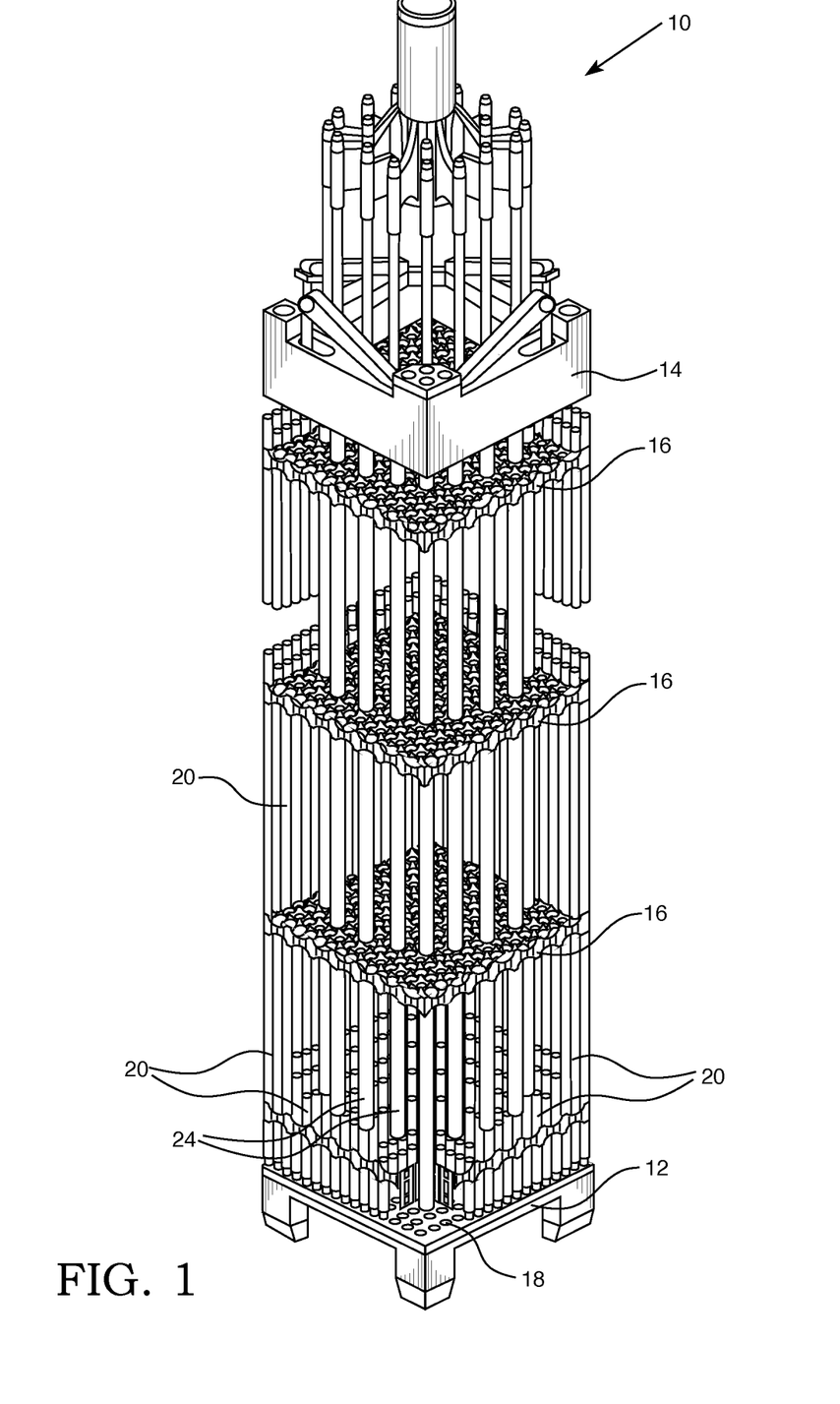
FIG. 1 is a view of relevant components of an exemplary nuclear fuel assembly.

For reference, a nuclear fuel assembly 10, shown in FIG. 1, generally includes a bottom nozzle 12, a top nozzle 14, grids 16, fuel rods 20, and assembly support rods 24. A series of channels 18 through the bottom nozzle 12 allow coolant to flow past the fuel rods 20 when the reactor is in use. In a conventional fuel assembly, an additional protective grid and bottom grid may be provided. These components may be eliminated with the improved retention system described herein. The improved design will yield a significant cost savings owing to the redesign of various components to allow for material reduction and parts consolidation.

Figure 2:
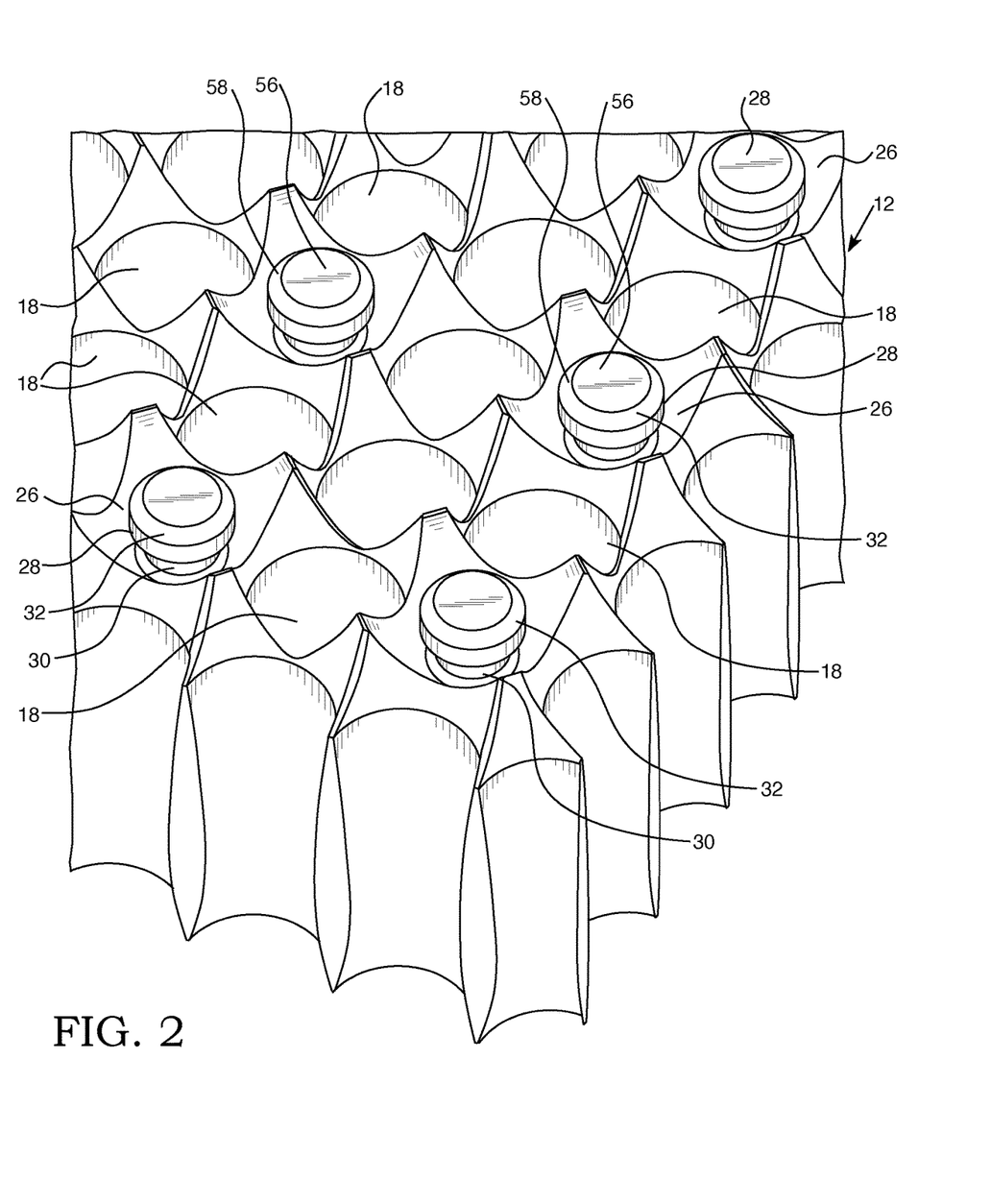
FIG. 2 is a partial isometric section view of an embodiment of a bottom nozzle of a fuel assembly showing an embodiment of fuel rod retainer within the recesses for seating the end plugs of fuel rods and adjacent coolant flow channels.

An exemplary embodiment of a bottom nozzle 12 is shown in FIG. 2. The bottom nozzle 12 shown includes recesses 26 and adjacent flow channels 18. The recesses 26 shown in FIG. 2 have a concave surface with curved, generally hyperbolically shaped edges. In the arrangement shown, there are alternating rows, with one row having only side-by-side channels 18 adjacent to a row having alternating channels 18 and recesses 26. With this arrangement, each recess 26 has a channel 18 on each side of the recess so that coolant flowing through the channels 18 will flow past all sides of each fuel rod 20 during operation. The channels form open conduits through which coolant, such as water, flows.

Nozzles 12 may be made from any suitable material that can tolerate conditions in a nuclear reactor. Exemplary materials include stainless steel, Ni based alloys, and commercially available alloys such as Inconel™, which has a nickel, chromium, and molybdenum composition.

Figure 3:
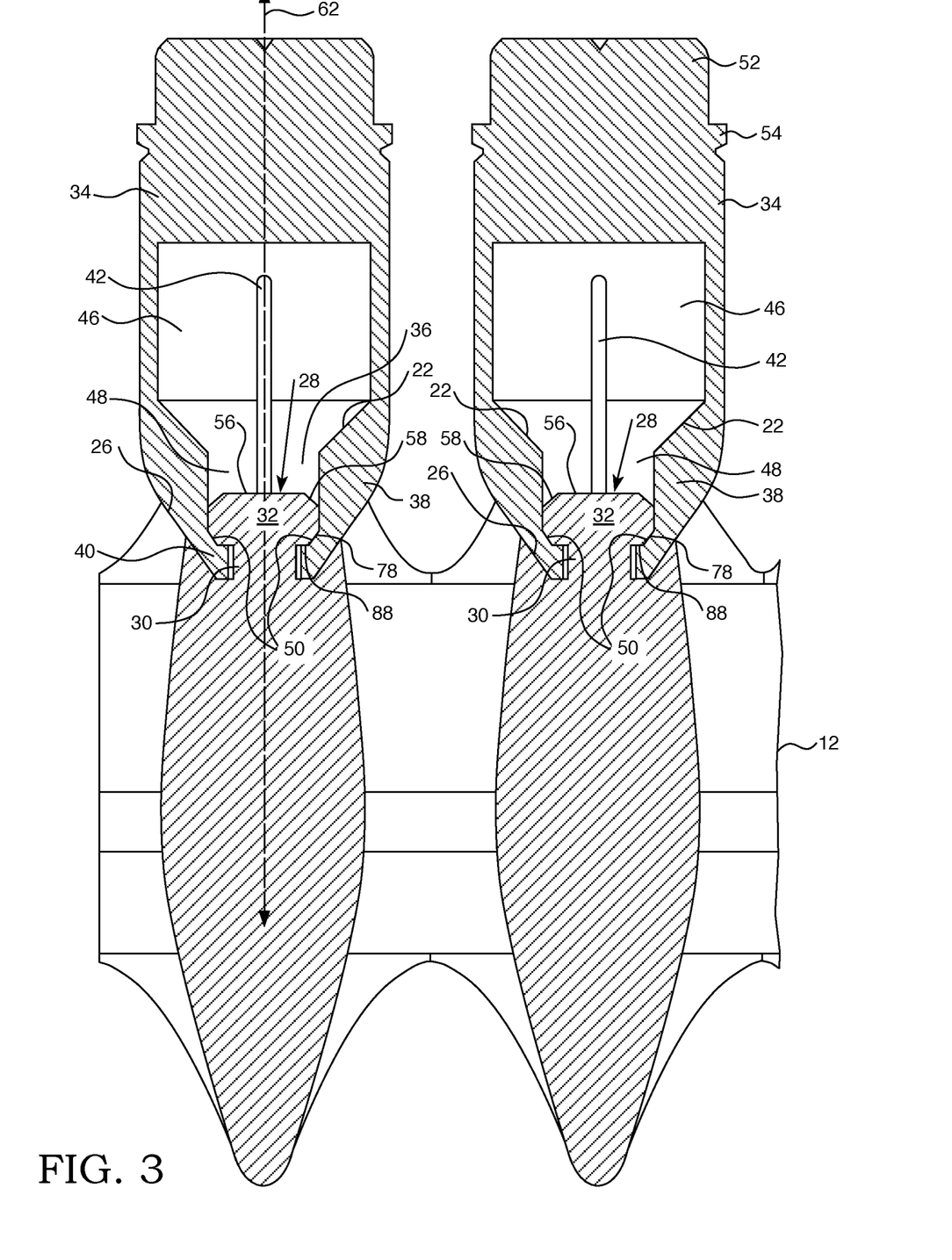
FIG. 3 is a side elevation sectional view of the fuel rod retainer of FIG. 2 connected to complementary engagement surfaces on an embodiment of a segmented end plug.

In various aspects, each recess 26 may include a retainer for engaging an engagement surface on an end plug 34 of a fuel rod 20 when seated in the recess 26. In certain aspects, the retainer may be a boss 28 in the form of a stem 30 projecting upwardly from the center of the recess 26, in coaxial alignment with the central axis 62 (see FIG. 3) of the recess 26. The stem 30 expands into a larger flanged portion 32, which in the exemplary embodiment shown, has a diameter larger than the diameter of the stem 30. The flanged portion 32 is positioned above and extends radially outwardly from the stem 30. The profile of the flanged portion 32, as shown in FIG. 3, defines a flat top 56, an upper bevel 58, a cylindrical mid surface and a lower bevel 78 leading to a flat underside 88. Contours of the flanged portion 32, such as lower bevel 78 and underside 88 together with the sloping concave surface of recess 26 illustrate an exemplary embodiment of an engagement surface in the recess 26 to engage an engagement surface on the end plug 34.

Referring to FIG. 3, the engagement surfaces of end plugs 34 may be in the form of a cavity 36. In the embodiment shown in FIG. 3, the cavity 36 includes an upper cavity 46 narrowing through a chamfered edge 22 to a lower cavity 48. The walls of the lower cavity 48 define ends 38 having grasping tips 40. A contoured face 50 on tip 40 complements the lower beveled edge 78 and underside 88 of boss 28. The grasping tip 40 and end portion 38 of the end plugs 34 sit in the recesses 26 in bottom nozzle 12 and slide under and engage the flanged portion 32 of boss 28 to engage the complementary mating surfaces of the end plugs and bottom nozzle. The contours of the engagement surfaces fit or snap together to secure the fuel rod connected to the end plug into axial alignment in the fuel assembly. Although not shown in FIGS. 3 and 4 for clarity, a fuel rod 20 would be connected, typically by welding, to the plug portion 52 and lip 54 on each end plug 34. The engagement of the end plugs 34 to the recesses 26 of the bottom nozzle 12 will axially engage the fuel rods 20 to the nozzle 12. Those skilled in the art will appreciate that other surface contours for the end plug and nozzle retainers may be used as complementary engagement surfaces for axial retention of the fuel rods 20 when connected to the end plugs 34.

The end plugs 34 may be made of any material suitable for use in a nuclear reactor. An exemplary material is a zirconium based alloy, referred to as Zircaloy. Other alloys that can withstand the temperatures and other conditions found in a nuclear reactor and that will not react with the fissile material in the fuel rod may be used for the end plugs 34.

Figure 4:
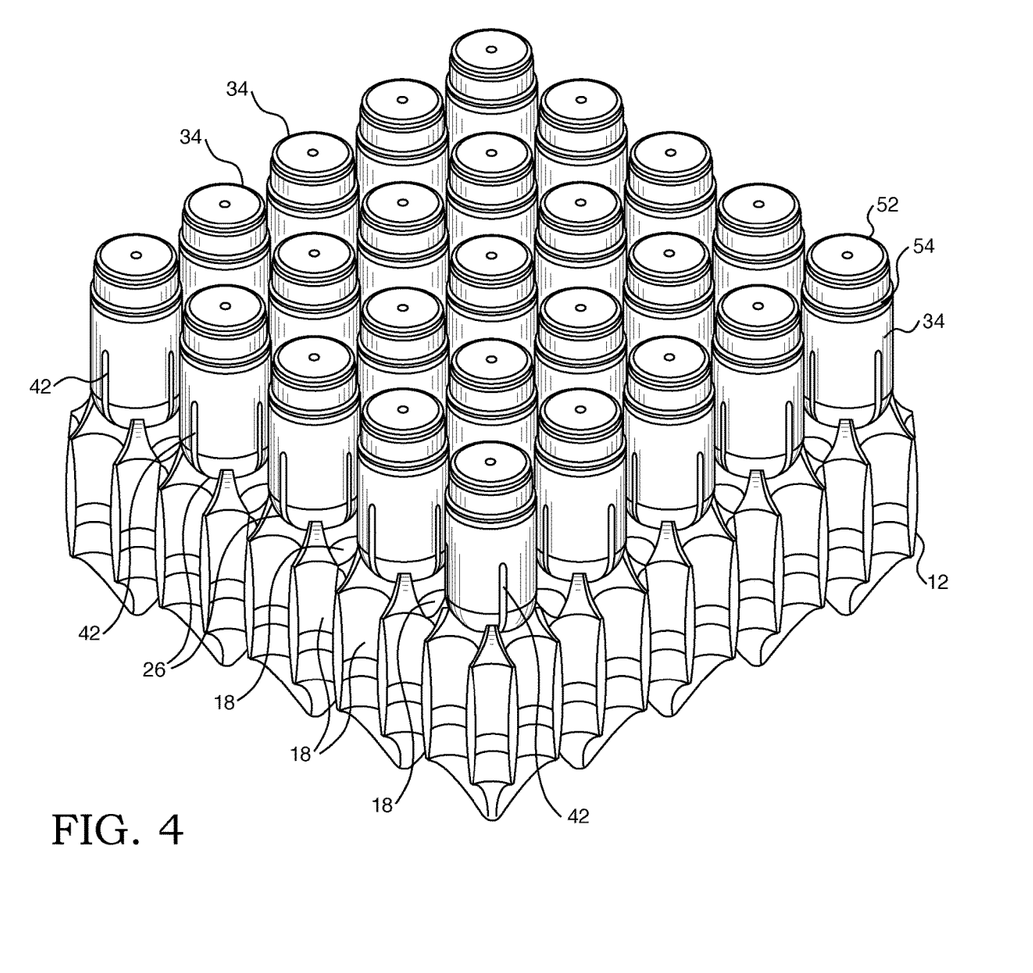
FIG. 4 is an isometric view of the bottom nozzle of FIG. 2 showing the segmented end plugs of several fuel rods (without the fuel rod attached, for clarity) in engagement with the fuel rod retainers of FIG. 3.

For ease of attachment, the end plugs 34 may be segmented. As shown in FIGS. 3 and 4, end plugs 34 may include one or more gaps 42 to add flexibility to the end portions 38. The metal end plugs 34 having gaps 42 lend flexibility to the end portions 38 of the end plugs 34 so that the end plugs can snap onto the rigid retainer, such as boss 28, in the recess 26.

Figure 5:
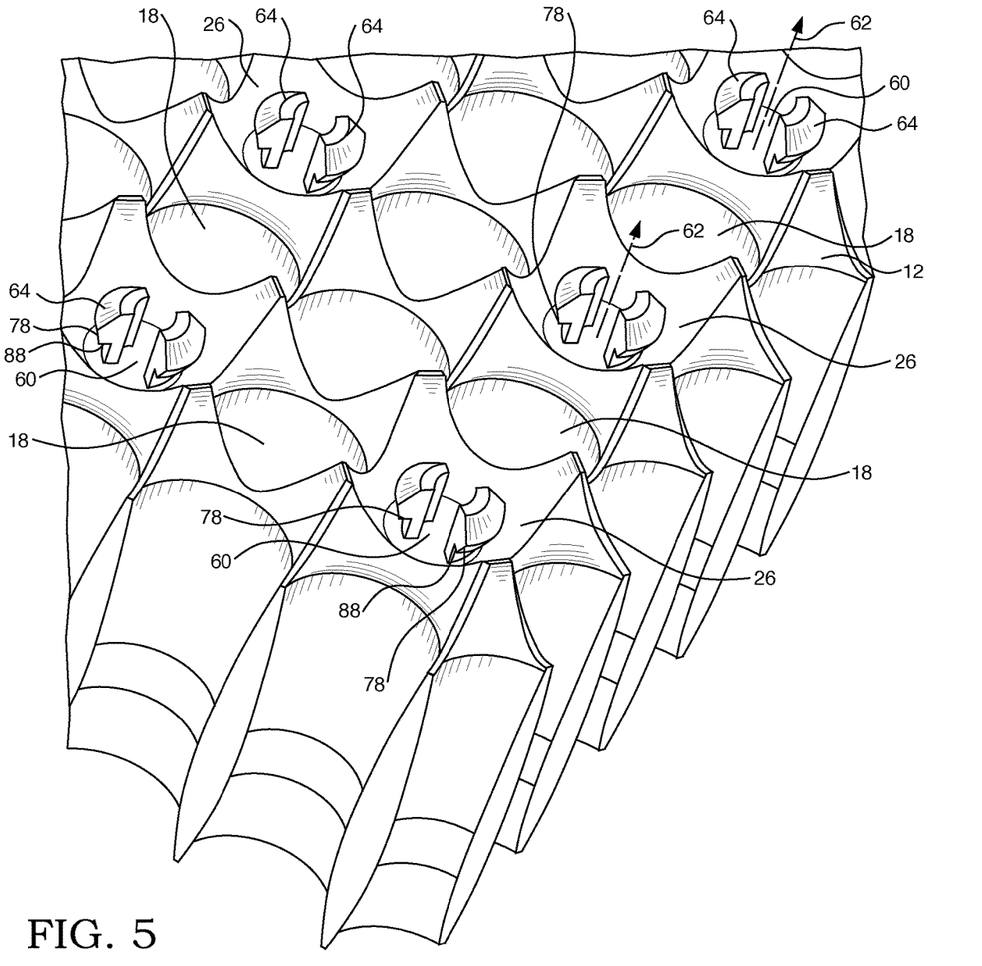
FIG. 5 is a partial isometric section view of an embodiment of a bottom nozzle of a fuel assembly showing an embodiment of segmented fuel rod retainers adjacent coolant flow channels.
Figure 6:
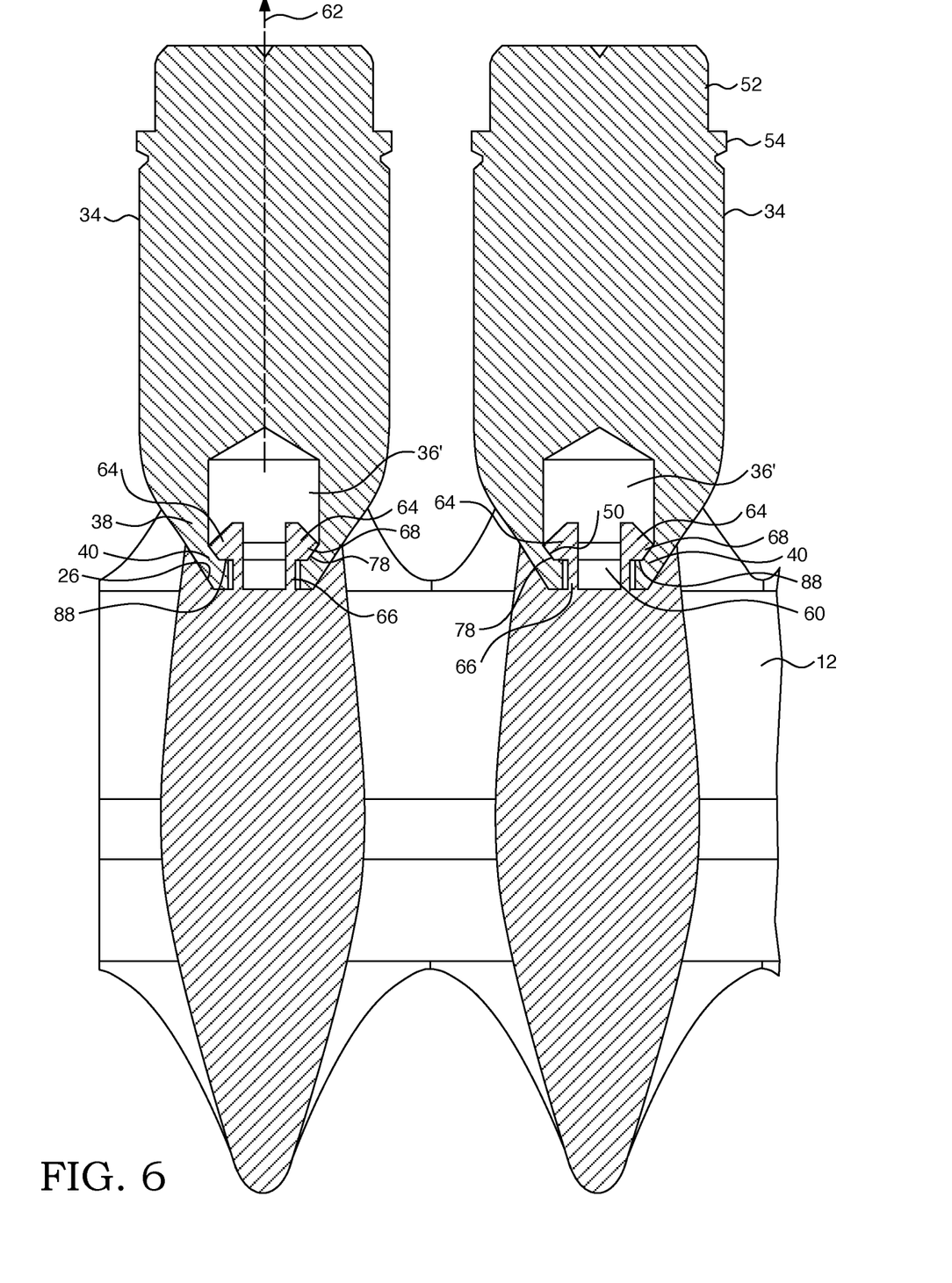
FIG. 6 is a side elevation section view of an embodiment of an end plug having an engagement surface for complementary engagement with the fuel rod retainers of FIG. 5.
Figure 7:
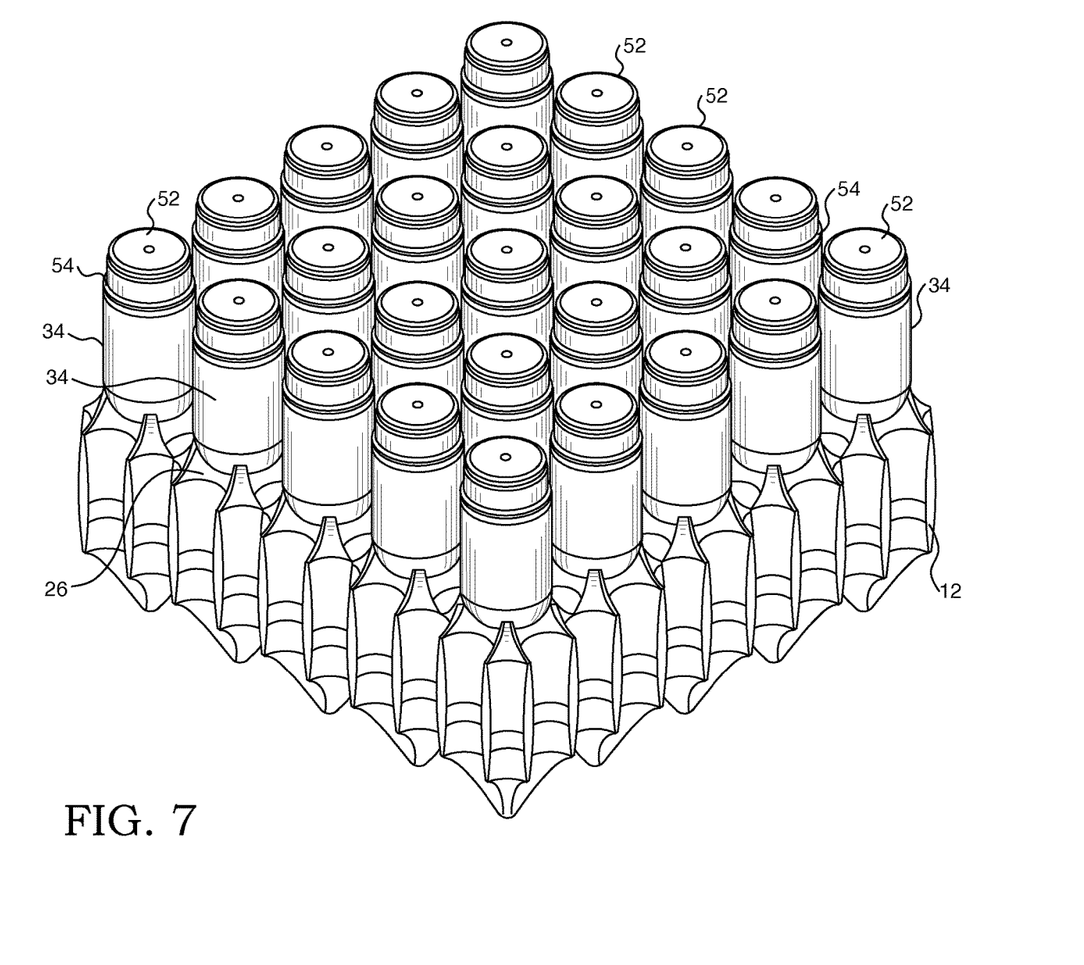
FIG. 7 is an isometric view of a plurality of the end plugs (without the fuel rod attached, for clarity) of FIG. 6 seated in recesses of an embodiment of a bottom nozzle and in engagement with the fuel rod retainers of FIG. 5.

An alternative embodiment of the retention system is shown in FIGS. 5-7. In various aspects, the retention system may include a segmented retainer in the recesses 26 of the nozzle 12. In this embodiment, the end plug 34 has rigid features. As shown in FIG. 5, the retainer may be in the form of at least two or more segmented boss sections 64 spaced apart from each other to define a gap 60. A pair of boss sections 64 is shown. The boss sections 64 have some features similar to those of boss 28 in that there is a stem portion 66 and a flanged portion 68. The flanged portion 68, however, has a narrow flat top ledge, a larger chamfered side, with a similar bottom bevel 78 and flat underside 88 for engaging the engaging face 50 of grasping tips 40 of an end plug 34. The boss sections 64 may, as shown, be in the form of arced segments of a retainer structure similar to boss 28 arranged around or on opposing sides of the central axis 62 of the recess 26 in which the boss sections 64 are formed. The boss sections 64 may, in various aspects, be spaced equidistant from the central axis 62 of the recess 26. The gap 60 lends flexibility to the boss sections 64 which project from recesses 26 of nozzle 12 so that the rigid end portions 38 of the end plugs 34 can snap onto the flexible retainer, such as boss sections 64. In this embodiment, as shown in FIGS. 6 and 7, the end plugs 34 do not include gaps 42 like those shown in FIGS. 3 and 4.

Referring to FIG. 6, end plugs 34 may have a smaller cavity 36' than the cavity 36 shown in FIG. 3 because, among other things, segmentation and flexibility are not built into this rigid design embodiment. The cavities 36' have end portions 38 with grasping tips 40 and engaging faces 50 to engage the complementary surfaces of the bottom bevel 78 and underside 88 of flanged portions 68.

Those skilled in the art will appreciate that other surface contours for the engagement surfaces of the nozzle 12 and end plug 34 may be used for axial retention and, preferably additionally, lateral retention, of the fuel rods 20 when connected to the end plugs 34. The end plugs 34, for example, may have projecting retainers and the recesses 26 of nozzle 12 may have surfaces contoured to receive the retainers on the end plugs. For example, FIGS. 9 and 10 illustrate cavities or channels 82 in the recesses 26' of nozzle 12 which may receive a projecting retainer on the end plug 34.

Figure 8:
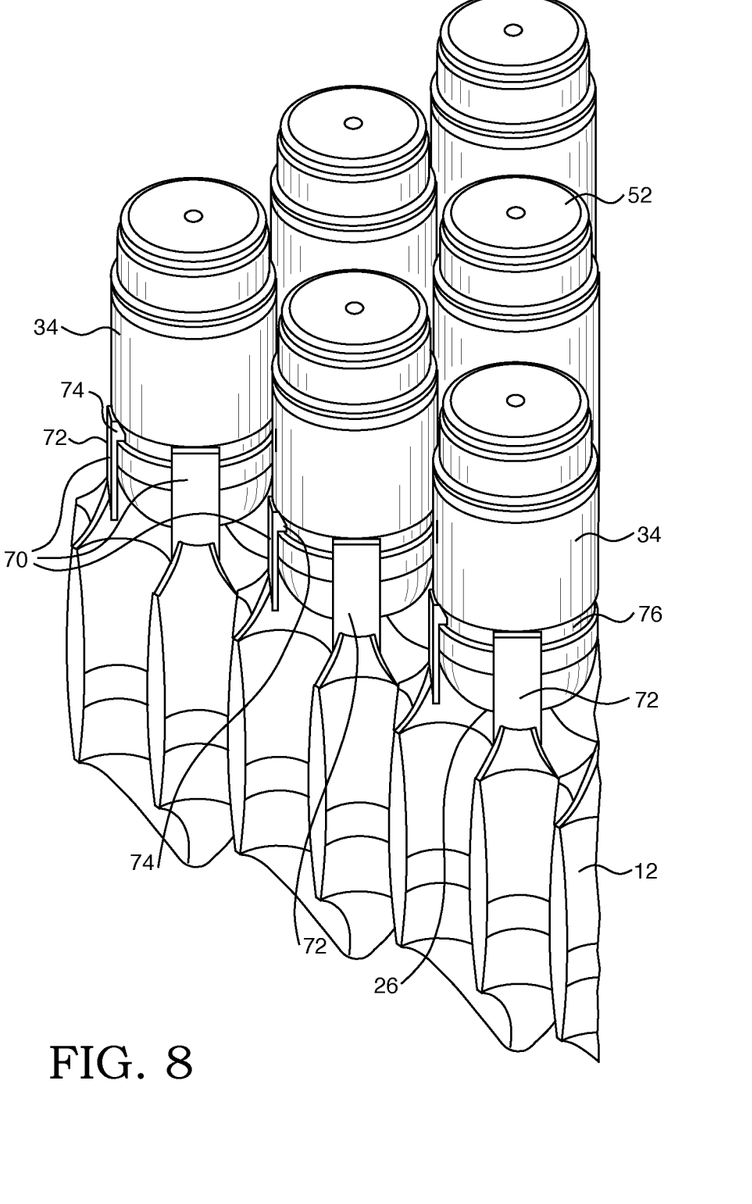
FIG. 8 is a partial isometric view of end plugs of several fuel rods (without the fuel rod attached, for clarity) in engagement with an alternative embodiment of fuel rod retainers projecting from the periphery of the bottom nozzle recesses.
Figure 9:
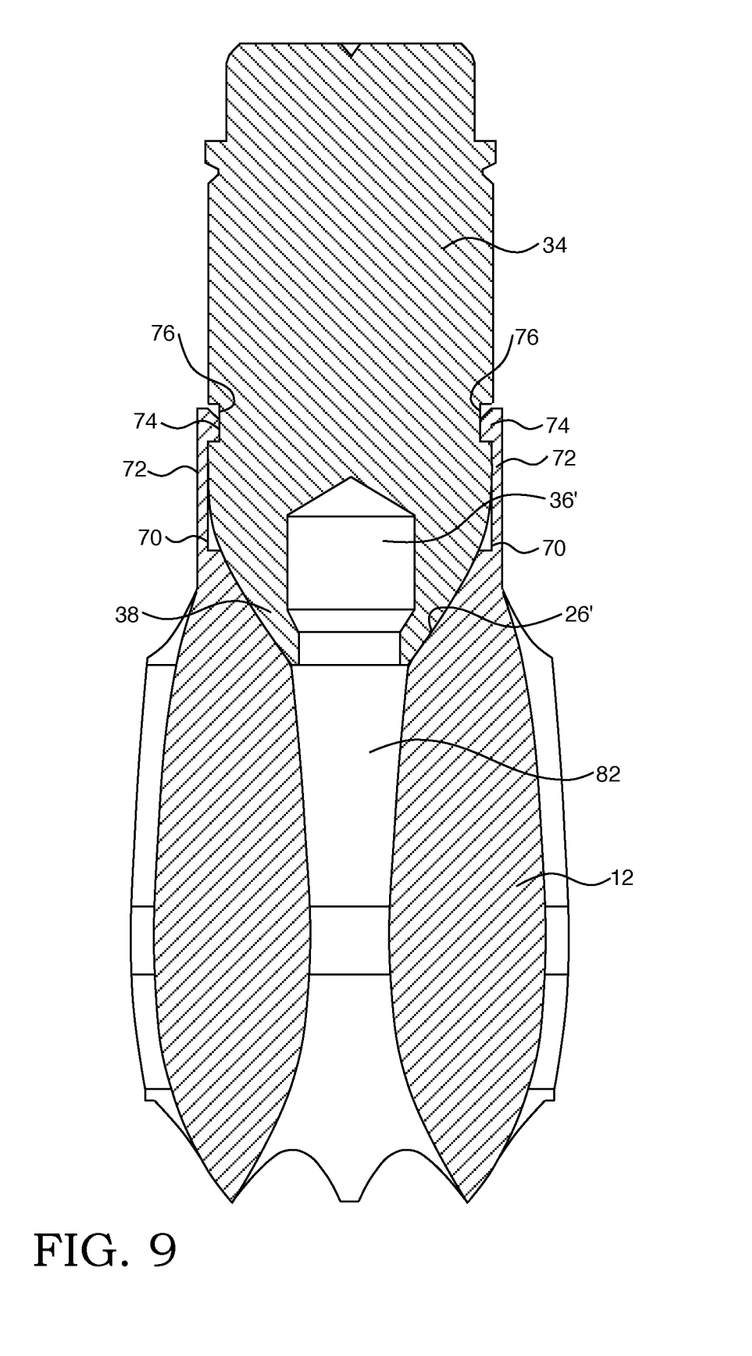
FIG. 9 is a side elevation section view the end plug, bottom nozzle and fuel rod retainers of FIG. 8.
Figure 10:
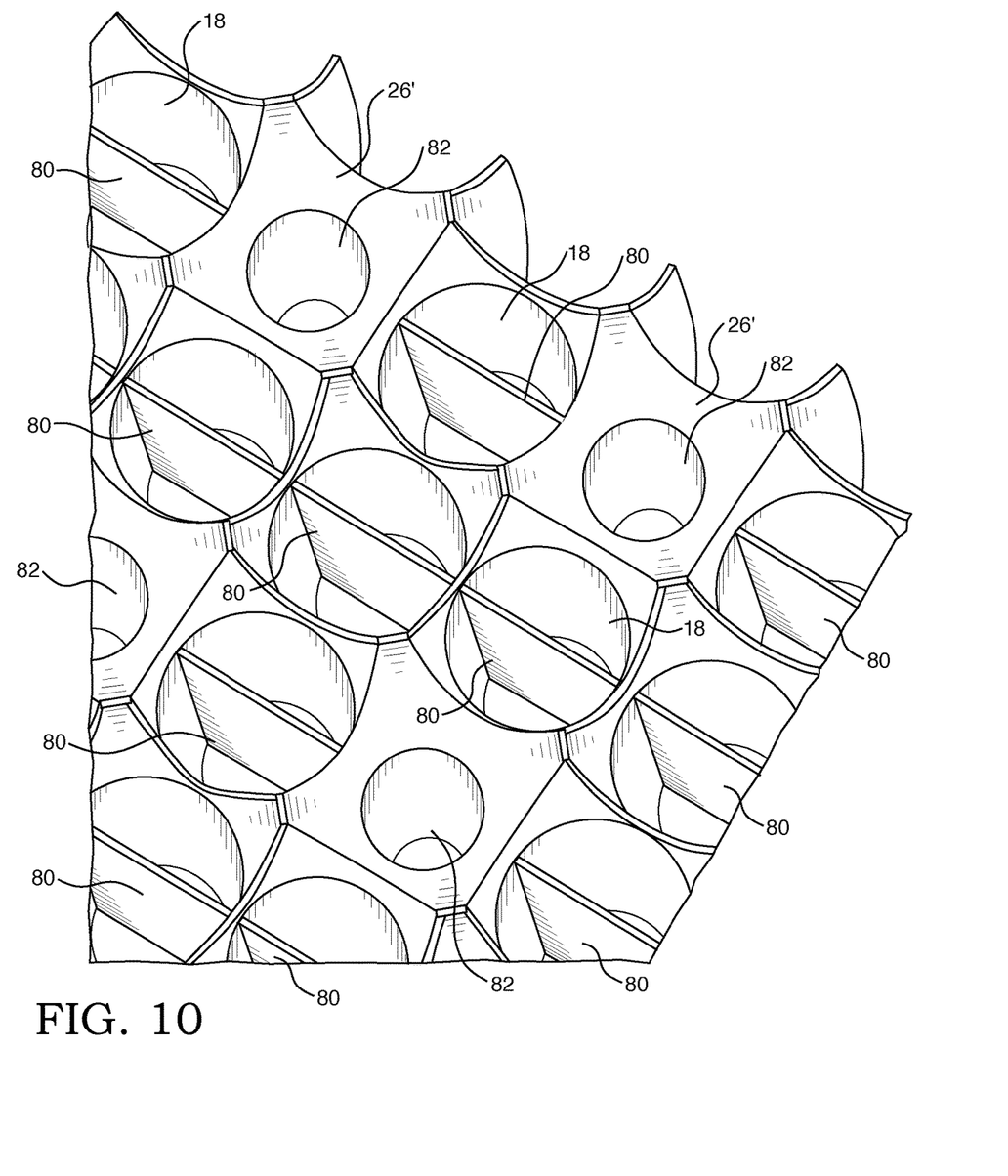
FIG. 10 is an isometric view of the top of an exemplary bottom nozzle of a fuel assembly showing the recesses of FIG. 9 for seating the end plugs of fuel rods and adjacent coolant flow channels with deflector ribs as one embodiment of means to deflect debris from entering the fuel assembly.

An alternative arrangement for the retention system is shown in FIGS. 8 and 9. The retainers that project upwardly from the recesses 26 may project from the periphery of the recess 26 instead of, or in addition to, those retainers projecting from the center. In various aspects, peripheral retainers 70 include an arm 72 and end clip 74. The design of the arms 72 allows for flexibility of the peripheral retainers 70 so that rigid end plugs 34 can be easily inserted into recesses 26. The arm 72 of each peripheral retainer 70 may in various aspects be biased inwardly towards the central axis 62 of the recess 26 for securing the end clip 74, in use, in the groove 76 of the end plug 34. The end clip 74 has a contoured surface that snaps into groove 76 on the exterior of the end plug 34. At least one and preferably multiple peripheral retainers 70 may be associated with each recess 26 to engage the engaging surface, such as groove 76, on the end plugs 34. There may, for example, be two, three, four or more peripheral retainers 70 that project from and are spaced around the periphery of each recess 26. The peripheral retainers 70 provide lateral and axial retention of the fuel rods 20. As stated, peripheral retainers 70 may be used alone or may be second retainers to be combined with axially positioned retainers, such as boss 28 or boss segments 64.

Each of the embodiments of the retention system described herein will provide axial retention of each fuel rod 20 engaged by the improved retention system so that the fuel rods are restrained from pulling away for alignment within the fuel assembly. In addition, the retention system provides lateral support for vibration reduction during operations.

The improved retention system may also comprise debris deflectors, such as ribs 80 positioned in the channels 18 of nozzle 12. In the absence of the protective grid and the bottom grid that are able to be eliminated in the improved design, the debris deflection function served by those components may be replaced by adding debris deflectors directly in channels 18. FIG. 10 shows an exemplary embodiment of ribs 80 positioned in channels 18. The ribs 80 can be shaped and the flow channels 18 sized to minimize flow losses. Apart from the debris deflectors, such as ribs 80 incorporated into flow channels 18, the flow and debris filtering designs disclosed in co-pending U.S. patent application Ser. No. 14/243,954 filed Apr. 3, 2014, incorporated herein by reference, are used in the nozzle 12 design.

The components of the retention system described herein may be fabricated by additive manufacturing techniques, which construct the components in very thin layers. The layering of the alloys allows complex geometries to be incorporated into the components that were not heretofore feasible with conventional fabrication techniques.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A nuclear reactor assembly comprising a bottom nozzle, a top nozzle, a plurality of fuel rods extending axially between the top and bottom nozzles, channels defined in at least the bottom nozzle for passage of coolant past the fuel rods, and each fuel rod having at least a bottom end plug, the nuclear reactor assembly comprising:
   a plurality of recesses in the bottom nozzle, each recess configured for seating the bottom end plug of one of the plurality of fuel rods, and each recess defining a central axis therethrough;
   a plurality of first engagement surfaces on the bottom nozzle, one engagement surface for each fuel road;
   a second engagement surface on the bottom end plug of each fuel rod;
   the first and second engagement surfaces being configured for engagement with each other for axially retaining each fuel rod within the nuclear reactor assembly; and
   the first engagement surface comprising at least one retainer projecting upwardly from the recess for engagement with the second engagement surface of the bottom end plug, wherein the retainer comprises at least one boss member having a stem portion extending axially relative to the central axis from the recess and a flanged portion extending radially outwardly from the stem portion.

2. The nuclear reactor assembly of claim 1 wherein the second engagement surface of the bottom end plug is segmented.

3. The nuclear reactor assembly of claim 1 wherein the boss member is comprised of segmented sections of the stem portion and flanged portions spaced from each other equidistant from the central axis of the recess.

4. The nuclear reactor assembly of claim 1 wherein each second engagement surface is comprised of a cavity for receiving the boss member, the cavity having end portions for engagement with the flanged portion of the boss member.

5. The nuclear reactor assembly of claim 4 wherein one of the first and second engagement surfaces is flexible for enabling movement thereof, in use, during engagement of the first and second engagement surfaces.

6. The nuclear reactor assembly of claim 5 wherein the cavity comprises at least one longitudinal gap therein for enabling flexible movement of the end portions of the cavity.

7. The nuclear reactor assembly of claim 6 wherein the boss member is rigid.

8. The nuclear reactor assembly of claim 5 wherein the boss member comprises a pair of stem and flanged portions spaced from each other for enabling flexible movement of the stem portions.

9. The nuclear reactor assembly of claim 8 wherein the cavity and end portions thereof are rigid.

10. The nuclear reactor assembly of claim 1 further comprising at least one second retainer projecting upwardly from the periphery of the recess for lateral retention, in use, of the fuel rod.

11. The nuclear reactor assembly of claim 10 wherein the second retainer comprises an arm portion and a clip portion.

12. The nuclear reactor assembly of claim 11 further comprising a groove around the exterior of the bottom end plug for receiving the clip portion of the second retainer.

13. The nuclear reactor assembly of claim 12 wherein the arm portion is biased inwardly towards the central axis of the recess for securing the clip portion, in use, in the groove of the bottom end plug.

14. The nuclear reactor assembly of claim 10 further comprising a plurality of second retainers projecting from each recess.

15. The nuclear reactor assembly of claim 1 further comprising a debris deflector positioned in each of a plurality of the channels in the bottom nozzle.

16. The nuclear reactor assembly of claim 15 wherein the debris deflectors comprise ribs.

* * * * *